United States Patent
Tannenbaum et al.

(10) Patent No.: US 10,503,513 B2
(45) Date of Patent: Dec. 10, 2019

(54) DISPATCHING A STORED INSTRUCTION IN RESPONSE TO DETERMINING THAT A RECEIVED INSTRUCTION IS OF A SAME INSTRUCTION TYPE

(71) Applicant: NVIDIA CORPORATION, Santa Clara, CA (US)

(72) Inventors: David Conrad Tannenbaum, Austin, TX (US); Srinivasan (Vasu) Iyer, Austin, TX (US); Stuart F. Oberman, Sunnyvale, CA (US); Ming Y. Siu, Santa Clara, CA (US); Michael Alan Fetterman, Boxborough, MA (US); John Matthew Burgess, Austin, TX (US); Shirish Gadre, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 987 days.

(21) Appl. No.: 14/061,666

(22) Filed: Oct. 23, 2013

(65) Prior Publication Data

US 2015/0113254 A1 Apr. 23, 2015

(51) Int. Cl.
*G06F 9/38* (2018.01)
(52) U.S. Cl.
CPC .................. *G06F 9/3836* (2013.01)
(58) Field of Classification Search
CPC .............................. G06F 9/00–3897
(Continued)

(56) References Cited

U.S. PATENT DOCUMENTS 5,838,940 A * 11/1998 Savkar ............. G06F 9/3802
712/200
2004/0003309 A1* 1/2004 Cai ................... G06F 1/206
713/320
(Continued)

FOREIGN PATENT DOCUMENTS

WO WO 2013101147 A1 * 7/2013 ............. G06F 1/32

OTHER PUBLICATIONS

M. Gillespie, "Preparing for the Second Stage of Multi-Core Hardware: Asymmetric (Heterogeneous) Cores," Tech. Report—Intel, 2008; 7 pages.*
(Continued)

*Primary Examiner* — Keith E Vicary
(74) *Attorney, Agent, or Firm* — Artegis Law Group, LLP

(57) ABSTRACT

A subsystem is configured to support a distributed instruction set architecture with primary and secondary execution pipelines. The primary execution pipeline supports the execution of a subset of instructions in the distributed instruction set architecture that are issued frequently. The secondary execution pipeline supports the execution of another subset of instructions in the distributed instruction set architecture that are issued less frequently. Both execution pipelines also support the execution of FFMA instructions as well as a common subset of instructions in the distributed instruction set architecture. When dispatching a requested instruction, an instruction scheduling unit is configured to select between the two execution pipelines based on various criteria. Those criteria may include power efficiency with which the instruction can be executed and availability of execution units to support execution of the instruction.

21 Claims, 4 Drawing Sheets

(58) Field of Classification Search
 USPC .......................................... 712/34, 214, 216
 See application file for complete search history.

(56) References Cited

U.S. PATENT DOCUMENTS

| | | | | |
|---|---|---|---|---|
| 2004/0215987 A1* | 10/2004 | Farkas | .................. | G06F 1/3203 |
| | | | | 713/300 |
| 2005/0013705 A1* | 1/2005 | Farkas | .................. | G06F 9/5088 |
| | | | | 417/393 |
| 2005/0251668 A1* | 11/2005 | Chaudhry | ............... | G06F 9/383 |
| | | | | 712/235 |
| 2006/0095807 A1* | 5/2006 | Grochowski | ........... | G06F 1/206 |
| | | | | 713/324 |
| 2010/0077185 A1* | 3/2010 | Gopalan | ............... | G06F 9/5033 |
| | | | | 712/220 |
| 2010/0115248 A1* | 5/2010 | Ouziel | .................. | G06F 9/3016 |
| | | | | 712/226 |
| 2011/0320766 A1* | 12/2011 | Wu | ..................... | G06F 9/30076 |
| | | | | 712/28 |

OTHER PUBLICATIONS

Rakesh Kumar, Dean M. Tullsen, Parthasarathy Ranganathan, Norman P. Jouppi, and Keith I. Farkas. Single-ISA Heterogeneous Multi-Core Architectures for Multithreaded Workload Performance. In Proceedings of the 31st annual international symposium on Computer architecture (ISCA '04). IEEE Computer Society, Washington, DC, USA; Jun. 2004; 12 pages.*

* cited by examiner

DISPATCHING A STORED INSTRUCTION IN RESPONSE TO DETERMINING THAT A RECEIVED INSTRUCTION IS OF A SAME INSTRUCTION TYPE

BACKGROUND OF THE INVENTION

Field of the Invention

Embodiments of the present invention relate generally to graphics processing and, more specifically, to improved efficiency in a distributed instruction set architecture.

Description of the Related Art

In computer systems, in general, and in graphics processing units (GPUs), in particular, a number of different instructions are typically required, each instruction directing a particular operation. In each generation of computer or GPU development, the instruction set architecture determines the instructions that are available for execution and the manner in which each instruction or instruction group is performed. This instruction set architecture is implemented by a collection of functional blocks that can range, in one extreme, from a wide array of elements, each optimized to perform a single instruction, to a small array of elements, in the other extreme, each designed to be able to perform multiple instructions. With many specialized elements, performance can be maximized, as each instruction can be optimally performed at any time, at the expense of increased power overhead due to the large number of other specialized elements that are left idle and the large area required to implement them. With a small number of more generalized elements, power efficiency can be improved due to the reduced area and reduced number of idle elements, at the expense of performance. Each generalized element cannot be optimized for all instructions, and delays can occur due to scheduling conflicts.

There is commonly a dominant instruction, that is, an instruction that is required to be performed much more frequently than other instructions. Typically, this instruction is a fused floating point multiply-add function (FFMA). Allocating the number of elements that perform the FFMA instruction (FFMA elements) and determining if these elements may be expanded with additional functionality to perform other instructions is a significant aspect of the instruction set architecture implementation.

One drawback to the above approach is that the generally negative correlation between processing performance and power usage affords no opportunity to simultaneously realize improved processing performance and more efficient power usage. Further, less commonly performed instructions impose a burden on the system design that is nearly equal to that of most commonly required instructions such as the FFMA.

As the foregoing illustrates, what is needed in the art is a more optimized technique for implementing an instruction set architecture.

SUMMARY OF THE INVENTION

One embodiment of the present invention sets forth a computer-implemented method for scheduling instructions for execution, including receiving a first instruction, identifying a subset of execution pipelines within a plurality of execution pipelines based on a set of selection criteria, selecting a first execution pipeline within the subset of execution pipelines, where the first execution pipeline includes a first execution element configured to execute the first instruction using less power than other execution elements within other execution pipelines in the first subset would use when executing the first instruction, and dispatching the first instruction to the first execution pipeline for execution.

One advantage of the disclosed approach is that the performance benefits of a wide, dedicated-element architecture are substantially realized while achieving power savings approaching a single multifunctional processing element.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
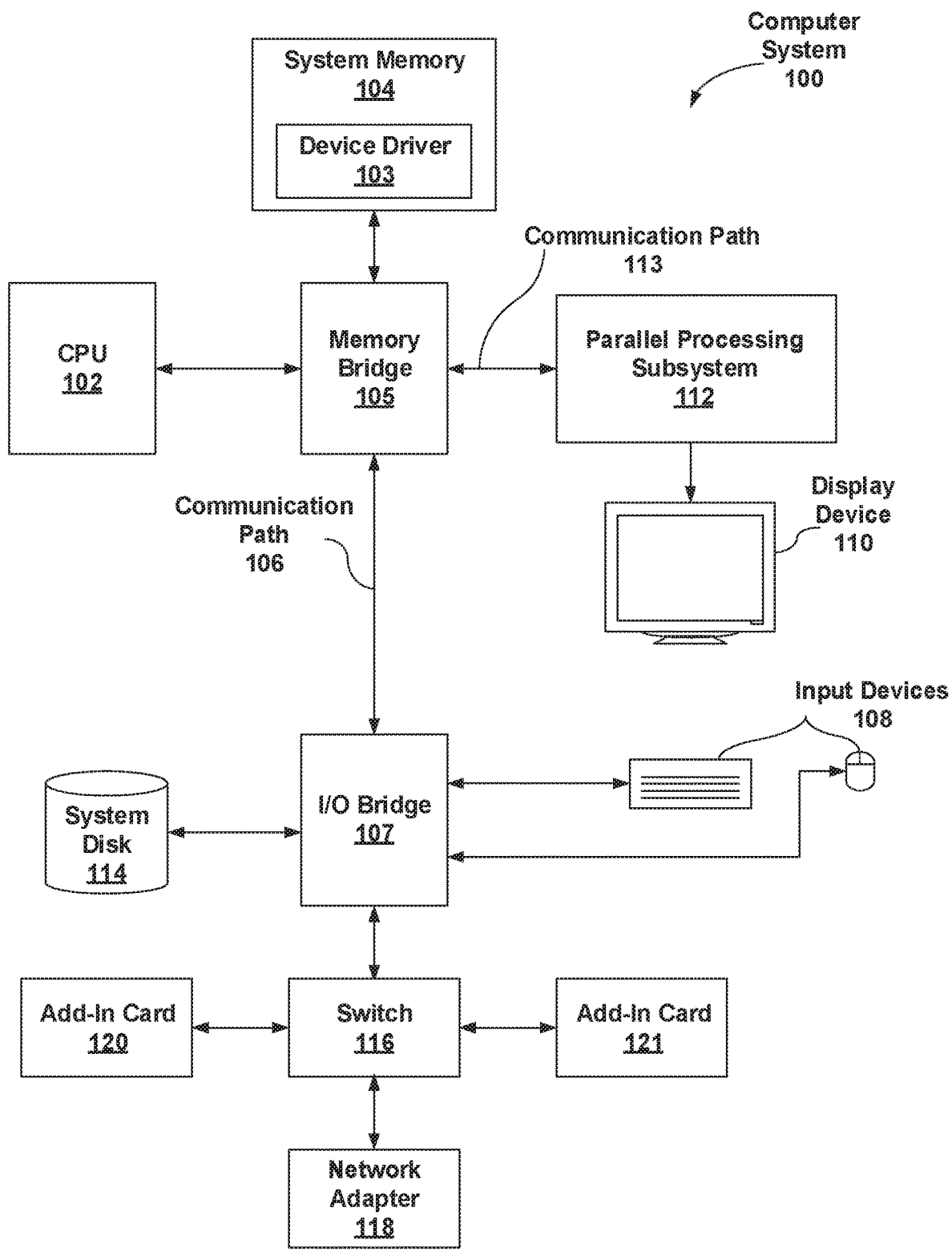
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
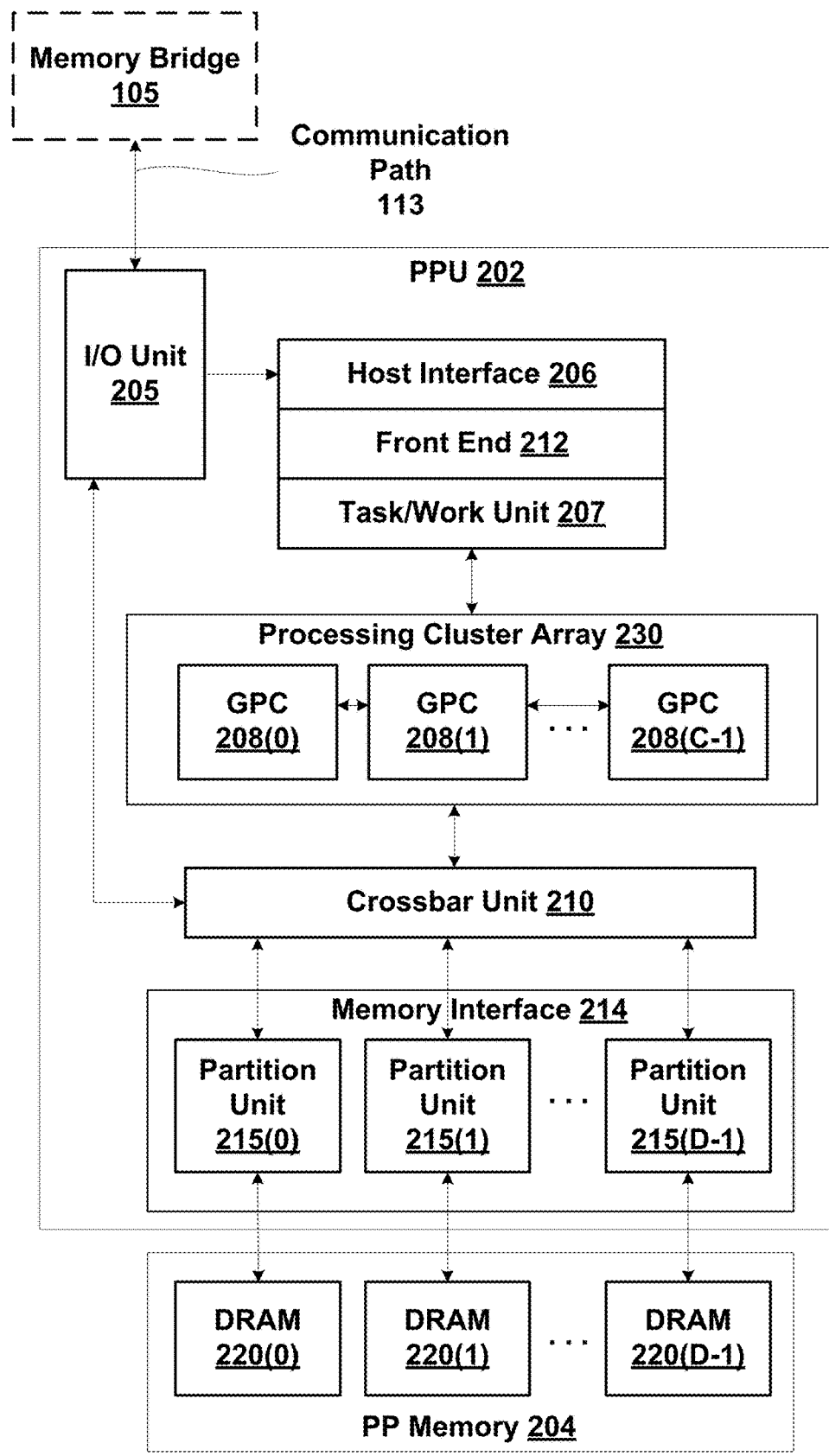
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Improved Efficiency Through a Distributed Instruction Set Architecture

Figure 3:
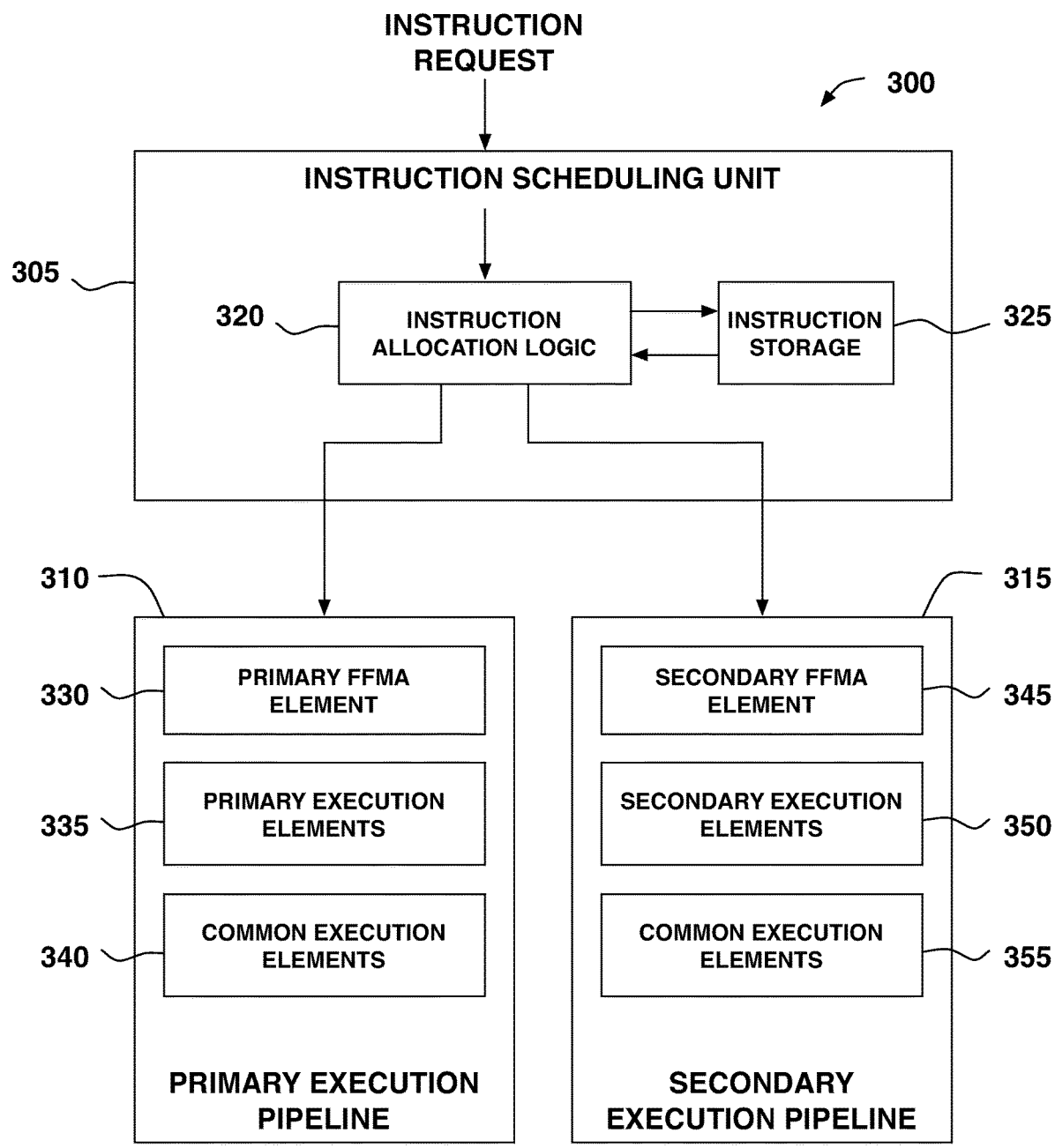
FIG. 3 is a conceptual diagram of a subsystem configured to support a distributed instruction set architecture, according to one embodiment of the present invention.

FIG. 3 is a conceptual diagram of a subsystem 300 configured to support a distributed instruction set architecture, according to one embodiment of the present invention. Subsystem 300 may be included within any portion of computer system 100 of FIG. 1. For example, CPU 102 of FIG. 1 or PPU 202 of FIG. 2 may include one or more instances of subsystem 300.

As shown, subsystem 300 includes instruction scheduling unit 305, primary execution pipeline 310, and secondary execution pipeline 315. Instruction scheduling unit 305 includes instruction allocation logic 320 and instruction storage 325. Primary execution pipeline 310 includes primary FFMA element 330, primary execution elements 335, and common execution elements 340. Secondary execution pipeline 315 includes secondary FFMA element 345, secondary execution elements 350, and common execution elements 355.

Primary FFMA element 330, primary execution elements 335, and common execution elements 340 within primary execution pipeline 310 include various execution elements (not individually shown). Each such execution element is configured to support the execution of one or more instructions specified in the distributed instruction set architecture associated with subsystem 300. In addition, the execution elements within primary execution pipeline 310 are optimized to minimize power usage as well as area.

Secondary FFMA element 345, secondary execution elements 350, and common execution elements 355 within secondary execution pipeline 315 also include various execution elements (also not individually shown), which may be similar to or different than those included within primary execution pipeline 310. However, similar to primary execution pipeline 310, each of the execution elements within secondary execution pipeline 315 is configured to support the execution of one or more instructions specified in the distributed instruction set architecture associated with subsystem 300.

Primary execution pipeline 310 and secondary execution pipeline 315, taken together, are configured to execute any instruction in the distributed instruction set architecture associated with subsystem 300. However, as noted above, those two execution pipelines may be configured to execute different instructions. Referring generally to primary execution pipeline 310 and secondary execution pipeline 315, the two execution pipelines represent alternate datapaths to which instruction scheduling unit 305 may dispatch instructions.

More specifically, primary execution pipeline 310 includes execution units that support the execution of frequently issued instructions, while secondary execution pipeline 315 includes execution units that support the execution of less frequently issued instructions. Since primary execution pipeline 310 is optimized to minimize power usage and area, primary execution pipeline 310 may efficiently execute a significant fraction of all instructions dispatched by instruction scheduling unit 305. Since secondary execution pipeline 315 is configured to support the other, less frequently issued instructions, primary execution pipeline 310 need not support those instructions, and may thus be further optimized to minimize power usage and area. Both primary execution pipeline 310 and secondary execution pipeline 315 also include execution elements that are common across both execution pipelines, thereby providing instruction scheduling unit 305 with redundant data paths to mitigate delays when either execution pipeline is unavailable.

As is shown, primary execution pipeline 310 and secondary execution pipeline 315 include various different collections of execution elements. The particular collections of execution elements within primary execution pipeline 310 and secondary execution pipeline 315 are described in greater detail below.

Primary FFMA element 330 within primary execution pipeline 310 and secondary FFMA element 345 within secondary execution pipeline 315 are both configured to support an FFMA instruction. An FFMA instruction typically specifies that operands A, B, and C should be combined according to the equation A*B+C, as is known in the art. Since the FFMA instruction is frequently issued in many use cases, primary and secondary FFMA element 330 and 345 provide parallel and redundant data paths for executing that instruction, thereby increasing potential throughput of subsystem 300.

Primary execution elements 335 within primary execution pipeline 310 and secondary execution elements 350 within secondary execution pipeline 315 support different collections of instructions. In other words, primary execution elements 335 support instructions that are not supported by secondary execution elements 350, and secondary execution elements 350 support instructions that are not supported by primary execution elements 335. Primary execution elements 335 generally support instructions that are very frequently issued, while secondary execution elements 350 generally support operations that are not very frequently issued. Further, primary execution elements 335 are optimized to minimize power usage and area, and so very frequently issued instructions may be efficiently executed via primary execution pipeline 310.

Common execution elements 340 within primary execution pipeline 310 and common execution elements 355 within secondary execution pipeline 315 both support the same collection of instructions. Common execution elements 340 and 355 thus provide parallel and redundant datapaths for those instructions. The common elements within one of these redundant datapaths may have different characteristics than the corresponding elements in the redundant datapath. Specifically, a common element in one datapath may have reduced power usage versus the corresponding element in the redundant datapath. Similarly, a common element in one datapath may have reduced latency versus the corresponding element in the redundant datapath. However, a particular element within one of the datapaths may not necessarily be superior to the corresponding element in the redundant datapath in all characteristics. As a general matter, one implementation of an execution element configured to perform a given operation or set of operations may have different execution characteristics than another implementation configured to perform the same operation(s).

In operation, instruction scheduling logic 305 receives instruction requests. When an instruction request is received by instruction scheduling unit 305, instruction allocation logic 320 is configured to select one of primary execution pipeline 310 and secondary execution pipeline 315 to execute the requested instruction based on various criteria. First, instruction allocation unit 320 determines which of the aforementioned two execution pipelines is capable of executing the requested instruction. Just one of the two execution pipelines may be capable of executing the requested instruction, or both of those execution pipelines may be capable of executing the instruction. For example, the requested instruction could only be supported by primary execution elements 335 within primary execution pipeline 310. Alternatively, the requested instruction could be supported by both of common execution elements 340 and 355 within primary and secondary execution pipelines 310 and 315, respectively, alike. If just one of the two execution pipelines is capable of executing the requested instruction, instruction allocation logic 320 may dispatch the instruction to that one execution pipeline or store the instruction within instruction storage 325 until that execution pipeline is available.

If instruction allocation logic 320 determines that either of the two execution pipelines is capable of executing the requested instruction, instruction scheduling unit 305 then determines which of the two execution pipelines is currently available. Either or both execution pipelines may be occupied executing other instructions or may be available and awaiting new instructions. If both execution pipelines are available, instruction allocation logic 320 selects the execution pipeline with the most power efficient execution element configured to execute the requested instruction. If just one of the two execution pipelines is available, instruction allocation logic 320 may dispatch the instruction to that one execution pipeline.

Instruction allocation logic 320 may also rely on other criteria for selecting between primary execution pipeline 310 and secondary execution pipeline 315. For example, instruction allocation logic 320 could select the execution pipeline that provides the lowest latency. Instruction allocation logic 320 could also select the execution pipeline that avoids hardware conflicts. Persons skilled in the art will recognize that instruction allocation logic 320 could employ a wide variety of different criteria for selecting between the two pipelines, and that instruction allocation logic 320 could apply some or all of the different criteria, in any order, when selecting between primary execution pipeline 310 and secondary execution pipeline 315.

In operation, subsystem 300 operates according to a variety of different possible cases, as further delineated herein. When the requested instruction is for an FFMA operation, instruction allocation logic 320 dispatches the instruction to primary FFMA element 330. If primary FFMA element 330 is in use, instruction allocation logic 320 instead dispatches the instruction to secondary FFMA element 345. If secondary FFMA element 345 is in use, instruction allocation logic 320 stores the instruction in instruction storage 325 for subsequent reevaluation, and evaluates the next queued instruction.

When the execution element needed to perform the requested instruction is common to both execution pipelines, instruction allocation logic 320 dispatches the instruction to common execution elements 340 in primary execution pipeline 310. However, if the required execution element within common execution elements 340 is in use, instruction allocation logic 320 instead dispatches the instruction to common execution elements 355 in secondary execution pipeline 315. If the execution element among within execution elements 355 is in use, instruction allocation logic 320 stores the instruction in instruction storage 325 for subsequent reevaluation, and evaluates the next queued instruction.

When the execution element needed to perform the requested instruction resides within primary execution elements 335 in primary execution pipeline 310, instruction allocation logic 320 dispatches the instruction to primary execution elements 335. However, if the needed execution element within primary execution element 335 is in use, instruction allocation logic 320 stores the instruction in instruction storage 325 for subsequent reevaluation, and evaluates the next queued instruction.

When the execution element needed to perform the requested instruction resides within secondary execution elements 350 in secondary execution pipeline 315, instruction allocation logic 320 dispatches the instruction to secondary execution elements 350. However, if the secondary execution element 350 is in use, instruction allocation logic 320 instead stores the instruction in instruction storage 325 for subsequent reevaluation, and evaluates the next queued instruction.

When the next queued instruction is the same as the stored instruction, instruction allocation logic 320 reevaluates the stored instruction. When the next queued instruction is different from the stored instruction, instruction allocation logic 320 evaluates the queued instruction. The various use-cases delineated above are also described, in stepwise fashion, below in conjunction with FIG. 4.

The foregoing discussion describes one embodiment of the present invention which achieves optimization of overall power efficiency and area usage while maintaining a high level of performance. The optimization of the primary FFMA element 330 may improve the power efficiency of subsystem 300. The availability of secondary FFMA element 345 further improves subsystem 300 performance by allowing concurrent execution of frequently issued instructions alongside the execution of less frequently issued instructions. Primary execution elements 335 and secondary execution elements 350 further enhance subsystem 300 performance by affording the ability to perform parallel processing of instructions with different frequencies of issuance. In addition, elements among secondary execution elements 350 perform rarely used instructions, providing further performance benefit by alleviating the burden to execute those instructions from primary execution pipeline 310.

Persons skilled in the art will recognize that the techniques described thus far may be applicable to any number of different parallel execution pipelines. Further, instruction scheduling unit 305 is configured to apply the aforementioned criteria when selecting between any such number of execution pipelines.

Figure 4:
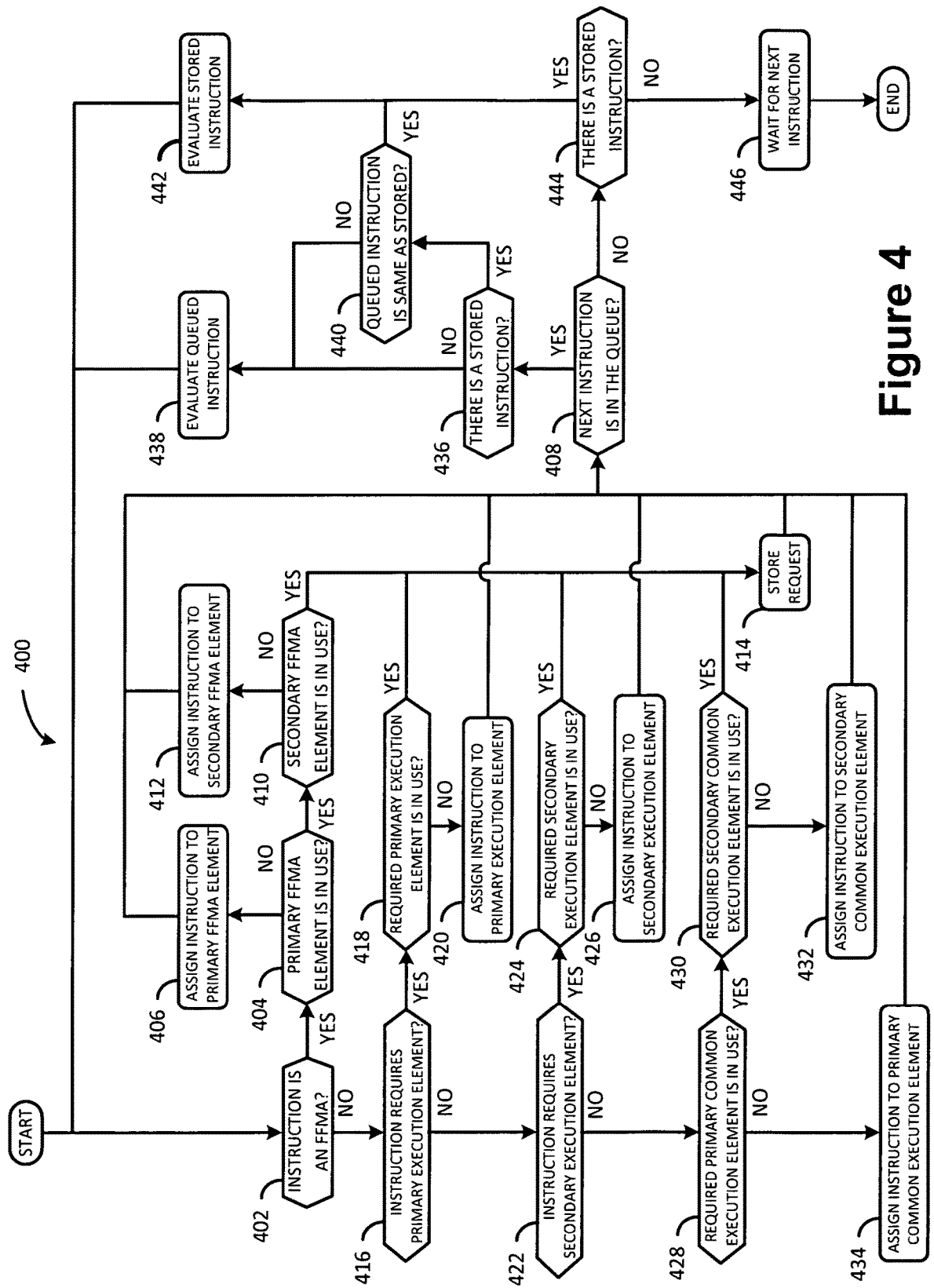
FIG. 4 is a flow diagram of method steps for scheduling instructions, according to one embodiment of the present invention.

FIG. 4 is a flow diagram of method steps for scheduling instructions, according to one embodiment of the present invention. Although the method steps are described in conjunction with the systems of FIG. 1-3, persons skilled in the art will understand that any system configured to perform the method steps, in any order, is within the scope of the present invention.

Instruction allocation logic 320 is configured to implement a method 400 in order to select an execution pipeline to which an instruction should be dispatched. In doing so, instruction allocation logic 320 may be configured to apply some of the criteria discussed above in conjunction with FIG. 3 in an exemplary order that is reflected in FIG. 4. However, persons skilled in the art will recognize that, in practice, instruction allocation logic 320 may apply some or all of the criteria discussed thus far, in any order, when selecting between execution pipelines.

As shown, the method 400 begins at step 402, where instruction allocation logic 320 determines if an incoming requested instruction is an FFMA operation. If, at step 402, instruction allocation logic 320 determines that the instruction requested is an FFMA operation, instruction allocation logic 320 proceeds to step 404. At step 404, instruction allocation logic 320 determines if primary FFMA element 330 is in use. If, at step 404, instruction allocation logic 320 determines that primary FFMA element 330 is not in use, then instruction allocation logic 320 proceeds to step 406. At step 406, instruction allocation logic 320 assigns the instruction to primary FFMA element 330. Instruction allocation logic 320 then proceeds to step 408.

If, at step 404, instruction allocation logic 320 determines that primary FFMA element 330 is in use, instruction allocation logic 320 proceeds to step 410. At step 410, instruction allocation logic 320 determines if secondary FFMA element 345 is in use. If, at step 410, instruction allocation logic 320 determines that secondary FFMA element 345 is in not use, instruction allocation logic 320 proceeds to step 412. At step 412, instruction allocation logic 320 assigns the instruction to secondary FFMA element 345. Instruction allocation logic 320 then proceeds to step 408. If, in step 410, instruction allocation logic 320 determines that secondary FFMA element 345 is in use, instruction allocation logic 320 proceeds to step 414.

If, at step 402, instruction allocation logic 320 determines that the requested instruction is not an FFMA operation, instruction allocation logic 320 proceeds to step 416. At step 416, instruction allocation logic 320 determines if the requested instruction can be performed by an element among primary execution elements 335. If, in step 416, instruction allocation logic 320 determines that the requested instruction can be performed by an element among primary execution elements 335, then instruction allocation logic 320 proceeds to step 418. At step 418, instruction allocation logic 320 determines if the requested element among primary execution elements 335 is in use. If, in step 418, instruction allocation logic 320 determines that the requested element among primary execution elements 335 is not in use, then instruction allocation logic 320 proceeds to step 420. At step 420, instruction allocation logic 320 assigns the instruction to primary execution elements 335. Instruction allocation logic 320 then proceeds to step 408. If, in step 418, if instruction allocation logic 320 determines that the requested element among primary execution elements 335 is in use, then instruction allocation logic 320 proceeds to step 414.

If, in step 416, instruction allocation logic 320 determines that the requested instruction cannot be performed by an element among primary execution elements 335, then instruction allocation logic 320 proceeds to step 422. At step 422, instruction allocation logic 320 determines if the requested instruction can be performed by an element among secondary execution elements 350. If, in step 422, instruction allocation logic 320 determines that the requested instruction can be performed by an element among secondary execution elements 350, then instruction allocation logic 320 proceeds to step 424. At step 424, instruction allocation logic 320 determines if the requested element among secondary execution elements 350 is in use. If, at step 424, instruction allocation logic 320 determines that the requested element among secondary execution elements 350 is not in use in step 424, then instruction allocation logic 320 proceeds to step 426. At step 426, instruction allocation logic 320 assigns the instruction to secondary execution elements 350. Instruction allocation logic 320 then proceeds to step 408. If, in step 424, instruction allocation logic 320 determines that the requested element among secondary execution elements 350 is in use, instruction allocation logic 320 proceeds to step 414.

If, at step 422, instruction allocation logic 320 determines that the requested instruction cannot be performed by an element among secondary execution elements 350, the requested instruction is, therefore, an instruction that can be performed by a common execution element. Instruction allocation logic 320 then proceeds to step 428. At step 428, instruction allocation logic 320 determines if the requested element among common execution elements 340 in primary execution pipeline 310 is in use. If, in step 428, instruction allocation logic 320 determines that the requested element among common execution elements 340 is in not use, then instruction allocation logic 320 proceeds to step 434. At step 434, instruction allocation logic 320 assigns the instruction to common execution elements 340. Instruction allocation logic 320 then proceeds to step 408. If, in step 428, instruction allocation logic 320 determines that the requested element among common execution elements 340 is in use, then instruction allocation logic 320 proceeds to step 430. At step 430, instruction allocation logic 320 determines if the requested element among common execution elements 355 is in use. If, in step 430, instruction allocation logic 320 determines that the requested element among common execution elements 355 is not in use, then instruction allocation logic 320 proceeds to step 432. At step 432, instruction allocation logic 320 assigns the instruction to the element among common execution elements 355. Instruction allocation logic 320 then proceeds to step 408. If, in step 430, instruction allocation logic 320 determines that the requested element among common execution elements 355 is in use, then instruction allocation logic 320 proceeds to step 414.

At step 408, instruction allocation logic 320 determines if there is a queued next instruction. If, in step 408, instruction allocation logic 320 determines that there is a queued next instruction, instruction allocation logic 320 proceeds to step 436. At step 436, instruction allocation logic 320 determines if there is a stored instruction. If, in step 436, instruction allocation logic 320 determines that there is not a stored instruction, instruction allocation logic 320 proceeds to step 438. At step 438, instruction allocation logic 320 evaluates the queued instruction as the method iterates at step 402.

If, in step 436, instruction allocation logic 320 determines that there is a stored instruction, then instruction allocation logic 320 proceeds to step 440. At step 440, instruction allocation logic 320 determines if the stored instruction is the same type as the queued next instruction identified in step 408. If, in step 440, instruction allocation logic 320 determines that the stored instruction is not the same type as the queued next instruction identified in step 408, then instruction allocation logic 320 proceeds to step 438. At step 438, instruction allocation logic 320 evaluates the queued instruction as the method iterates at step 402. If, in step 440, instruction allocation logic 320 determines that the stored instruction is the same type as the queued next instruction identified in step 408, then instruction allocation logic 320 proceeds to step 442. At step 442 instruction allocation logic 320 evaluates the stored instruction as the method iterates at step 402.

If, in step 408, instruction allocation logic 320 determines that there is not a queued next instruction, instruction allocation logic 320 proceeds to step 444. At step 444, instruction allocation logic 320 determines if there is a stored instruction. If, in step 444, instruction allocation logic 320 determines that there is a stored instruction, instruction allocation logic 320 proceeds to step 442. At step 442, instruction allocation logic 320 evaluates the stored instruction as the method iterates at step 402. If, in step 444, instruction allocation logic 320 determines that there is not a stored instruction, instruction allocation logic 320 proceeds to step 446. At step 446, instruction allocation logic 320 waits for a next instruction.

In sum, a subsystem is configured to support a distributed instruction set architecture with primary and secondary execution pipelines. The primary execution pipeline supports the execution of a subset of instructions in the distributed instruction set architecture that are issued frequently. The secondary execution pipeline supports the execution of another subset of instructions in the distributed instruction set architecture that are issued less frequently. Both execution pipelines also support the execution of FFMA instructions as well as a common subset of instructions in the distributed instruction set architecture. When dispatching a requested instruction, an instruction scheduling unit is configured to select between the two execution pipelines based on various criteria. Those criteria may include power efficiency with which the instruction can be executed and availability of execution units to support execution of the instruction.

One advantage of the systems disclosed herein is that the performance benefits of a wide, dedicated-element architecture are substantially realized while achieving power savings approaching a single multifunctional processing element. The most commonly needed operations are accommodated in multiple execution pipelines and can thus be performed in parallel, which enhances performance. In addition, the primary execution pipeline is optimized to minimize power usage, thereby providing a substantial reduction in dynamic and quiescent power consumption. Finally, by dispatching less frequent instructions to a secondary execution pipeline, the performance burden of less common instructions on the primary execution pipeline may be minimized.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for scheduling instructions for execution, the method comprising:
   receiving a first instruction;
   comparing the first instruction to a second instruction stored in an instruction storage and determining whether the first instruction is of a different instruction type than the second instruction;
   in response to determining that the first instruction is of a different instruction type than the second instruction:
      identifying a first subset of execution pipelines within a plurality of execution pipelines based on a first set of selection criteria,
      selecting a first execution pipeline within the first subset of execution pipelines, wherein the first execution pipeline includes a first execution element that executes the first instruction using less power than other execution elements within other execution pipelines included in the first subset of execution pipelines would use when executing the first instruction, and
      dispatching the first instruction to the first execution pipeline for execution; and
   in response to determining that the first instruction is of a same instruction type as the second instruction:
      dispatching the second instruction for execution within a second execution pipeline selected for the second instruction, wherein the second instruction is dispatched based on determining that the first instruction is of the same instruction type as the second instruction.

2. The computer-implemented method of claim 1, wherein identifying the first subset of execution pipelines comprises identifying at least one execution pipeline within the plurality of execution pipelines that is capable of executing the first instruction.

3. The computer-implemented method of claim 1, wherein identifying the first subset of execution pipelines comprises identifying at least one execution pipeline within the plurality of execution pipelines that is available to execute the first instruction.

4. The computer-implemented method of claim 1, wherein identifying the first subset of execution pipelines comprises identifying at least one execution pipeline within the plurality of execution pipelines that is capable of executing the first instruction with less than a threshold amount of latency.

5. The computer-implemented method of claim 1, wherein identifying the first subset of execution pipelines comprises identifying at least one execution pipeline within the plurality of execution pipelines that is capable of executing the first instruction without causing a hardware conflict.

6. The computer-implemented method of claim 1, further comprising:
   receiving a third instruction;
   determining that no execution pipelines within the plurality of execution pipelines are currently available to execute the third instruction; and
   storing the third instruction for dispatch at a later time.

7. The computer-implemented method of claim 1, wherein the first execution pipeline is capable of executing an instruction that no other execution pipeline in the plurality of execution pipelines is capable of executing.

8. The computer-implemented method of claim 1, wherein the first execution pipeline supports execution of at least one instruction that occurs more frequently in an instruction flow than another instruction that another execution pipeline within the plurality of execution pipelines supports.

9. The computer-implemented method of claim 1, wherein the first instruction indicates that a fused floating point multiply-add operation should be performed, and the first execution element comprises a fused floating point multiply-add element.

10. The computer-implemented method of claim 1, wherein:
   the first execution pipeline includes first execution elements that support instructions that are not supported by second execution elements included in the second execution pipeline, and
   the second execution elements support instructions that are not supported by the first execution elements.

11. The computer-implemented method of claim 1, further comprising:
   identifying a second subset of execution pipelines within the plurality of execution pipelines based on a second set of selection criteria; and
   selecting the second execution pipeline within the second subset of execution pipelines, wherein the second execution pipeline includes a second execution element that executes the second instruction using less power than other execution elements within other execution pipelines included in the second subset of execution pipelines would use when executing the second instruction.

12. A subsystem for scheduling instructions for execution, including:
   instruction storage; and
   instruction allocation logic coupled to the instruction storage and that:
      receives a first instruction;
      compares the first instruction to a second instruction stored in the instruction storage and determines whether the first instruction is of a different instruction type than the second instruction;
      in response to determining that the first instruction is of a different instruction type than the second instruction:
         identifies a first subset of execution pipelines within a plurality of execution pipelines based on a first set of selection criteria,
         selects a first execution pipeline within the first subset of execution pipelines, wherein the first execution pipeline includes a first execution element that executes the first instruction using less power than other execution elements within other execution pipelines included in the first subset of execution pipelines would use when executing the first instruction, and dispatches the first instruction to the first execution pipeline for execution; and in response to determining that the first instruction is of a same instruction type as the second instruction:
dispatches the second instruction for execution within a second execution pipeline selected for the second instruction, wherein the second instruction is dispatched based on determining that the first instruction is of the same instruction type as the second instruction.

13. The subsystem of claim 12, wherein the instruction allocation logic identifies the first subset of execution pipelines by identifying at least one execution pipeline within the plurality of execution pipelines that is capable of executing the first instruction.

14. The subsystem of claim 12, wherein the instruction allocation logic identifies the first subset of execution pipelines by identifying at least one execution pipeline within the plurality of execution pipelines that is available to execute the first instruction.

15. The subsystem of claim 12, wherein the instruction allocation logic identifies the first subset of execution pipelines by identifying at least one execution pipeline within the plurality of execution pipelines that is capable of executing the first instruction with less than a threshold amount of latency.

16. The subsystem of claim 12, wherein the instruction allocation logic identifies the first subset of execution pipelines by identifying at least one execution pipeline within the plurality of execution pipelines that is capable of executing the first instruction without causing a hardware conflict.

17. The subsystem of claim 12, wherein the instruction allocation logic further:
receives a third instruction;
determines that no execution pipelines within the plurality of execution pipelines are currently available to execute the third instruction; and
stores the third instruction in the instruction storage for dispatch at a later time.

18. The subsystem of claim 12, wherein the first execution pipeline is capable of executing an instruction that no other execution pipeline in the plurality of execution pipelines is capable of executing.

19. The subsystem of claim 12, wherein the first execution pipeline supports execution of at least one instruction that occurs more frequently in an instruction flow than another instruction that another execution pipeline within the plurality of execution pipelines supports.

20. The subsystem of claim 12, wherein the first instruction indicates that a fused floating point multiply-add operation should be performed, and the first execution element comprises a fused floating point multiply-add element.

21. A computing device for scheduling instructions for execution, including:
a memory including instructions; and
a processor coupled to the memory, the processor comprising:
a plurality of execution pipelines, and
an instruction scheduling unit that:
receives a first instruction from the memory;
compares the first instruction to a second instruction stored in an instruction storage and determines whether the first instruction is of a different instruction type than the second instruction;
in response to determining that the first instruction is of a different instruction type than the second instruction:
identifies a first subset of execution pipelines within a plurality of execution pipelines based on a first set of selection criteria,
selects a first execution pipeline within the first subset of execution pipelines, wherein the first execution pipeline includes a first execution element that executes the first instruction using less power than other execution elements within other execution pipelines included in the first subset of execution pipelines would use when executing the first instruction, and
dispatches the first instruction to the first execution pipeline for execution; and
in response to determining that the first instruction is of a same instruction type as the second instruction:
dispatches the second instruction for execution within a second execution pipeline selected for the second instruction, wherein the second instruction is dispatched based on determining that the first instruction is of the same instruction type as the second instruction.

* * * * *